United States Patent
Ravindran (10) Patent No.: US 9,477,842 B2
(45) Date of Patent: Oct. 25, 2016

(54) BUSINESS PARTNER DATA DELETION FOR PRIVACY

(71) Applicant: Dinesh Ravindran, Bangalore (IN)

(72) Inventor: Dinesh Ravindran, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/826,638

(22) Filed: Mar. 14, 2013

(65) Prior Publication Data

US 2014/0109238 A1    Apr. 17, 2014

Related U.S. Application Data

(60) Provisional application No. 61/713,853, filed on Oct. 15, 2012.

(51) Int. Cl.
| | |
|---|---|
| *G06F 21/00* | (2013.01) |
| *G06F 21/62* | (2013.01) |
| *G06F 21/60* | (2013.01) |
| *G06Q 10/06* | (2012.01) |

(52) U.S. Cl.
CPC .......... *G06F 21/62* (2013.01); *G06F 21/604* (2013.01); *G06F 21/6245* (2013.01); *G06Q 10/0635* (2013.01); *G06F 2221/2143* (2013.01)

(58) Field of Classification Search
CPC ........................................ G06F 21/62
USPC ...................................... 726/27
See application file for complete search history.

(56) References Cited

U.S. PATENT DOCUMENTS

| | | | |
|---|---|---|---|
| 5,689,699 A * | 11/1997 | Howell | G06F 17/30011 |
| 6,510,513 B1 * | 1/2003 | Danieli | 713/156 |
| 6,678,682 B1 * | 1/2004 | Jenkins et al. | |
| 7,680,830 B1 * | 3/2010 | Ohr et al. | 707/999.2 |
| 2002/0116648 A1 * | 8/2002 | Tran | 713/202 |
| 2003/0005174 A1 * | 1/2003 | Coffman et al. | 709/318 |
| 2003/0154401 A1 * | 8/2003 | Hartman et al. | 713/201 |
| 2003/0154403 A1 * | 8/2003 | Keinsley et al. | 713/201 |
| 2004/0034767 A1 * | 2/2004 | Robinson et al. | 713/152 |
| 2005/0114672 A1 * | 5/2005 | Duncan et al. | 713/182 |
| 2007/0283425 A1 * | 12/2007 | Ture et al. | 726/5 |
| 2009/0276860 A1 * | 11/2009 | Miyabashi | 726/30 |
| 2010/0228937 A1 * | 9/2010 | Bae et al. | 711/163 |
| 2012/0060207 A1 * | 3/2012 | Mardikar et al. | 726/4 |

OTHER PUBLICATIONS

Casassa Mont, Marco, and Robert Thyne. "Privacy policy enforcement in enterprises with identity management solutions." Journal of Computer Security 16.2 (2008): 133-163.*

Mont, Marco Casassa. "Dealing with privacy obligations in enterprises." ISSE 2004—Securing Electronic Business Processes. Vieweg+Teubner Verlag, 2004. 198-208.*

Mont, Marco Casassa, and Robert Thyne. "A systemic approach to automate privacy policy enforcement in enterprises." Privacy Enhancing Technologies. Springer Berlin Heidelberg, 2006.*

* cited by examiner

*Primary Examiner* — Syed Zaidi (74) *Attorney, Agent, or Firm* — Schwegman Lundberg & Woessner, P.A.

(57) ABSTRACT

Various embodiments illustrated and described herein include at least one of systems, modules, processes, methods, and software that operate to keep customer, vendor, and business partner private information private.

16 Claims, 5 Drawing Sheets

BUSINESS PARTNER DATA DELETION FOR PRIVACY

CROSS-REFERENCE TO RELATED APPLICATIONS

This application claims the benefit of U.S. Provisional Application No. 61/713,853, filed Oct. 15, 2012, entitled "DATA PRIVACY," which is incorporated herein by reference in its entirety.

BACKGROUND INFORMATION

Businesses today are collecting more information than ever on their customers and business partners. Such information is typically stored electronically in the form of data on data storage devices in files, databases, and other data structures. Much of this data may be considered private information by respective customers and business partners and do not want this data to be accessible or disclosed to the public. Further, privacy laws exist in some jurisdictions that require businesses to hold such information private and restrict how such data is to be handled and how long such data may be stored.

DETAILED DESCRIPTION

Various embodiments illustrated and described herein include at least one of systems, modules, processes, methods, and software that operate to keep sensitive data private, such as customer, vendor, and business partner data (e.g., payment, contact, and other personal and sensitive information). Such information is generally referred to as business partner data.

Some embodiments may be implemented to ensure compliance with jurisdictional legal requirements, company privacy policies, best practices, and other sources of data privacy constraints. Such embodiments generally include identifying business partner data that has not been utilized by computing applications of an organization for certain periods. Such periods may include a residence period and a retention period. A residence period is a period within which business partner data is generally accessible and after which, access is restricted to a small number of users and processes, such as a data privacy officer and data privacy processes. The residence period is typically a period that has to elapse before an end-of-purpose date can be determined and the business partner data can be blocked in a database or be archived. During the residence period, the business partner data remains accessible, can be changed, referenced, and new data business can be created. Once business partner data is blocked however, further usage of the business partner data by consuming applications is prevented. A retention period is a period after which business partner data is deleted (e.g., in one or more databases, archives, and the like), such as when the business partner data has not been accessed within the retention period, a purpose for maintaining the data has expired. Some embodiments may further include an archiving process to archive business partner data, access to which has been restricted.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software, or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
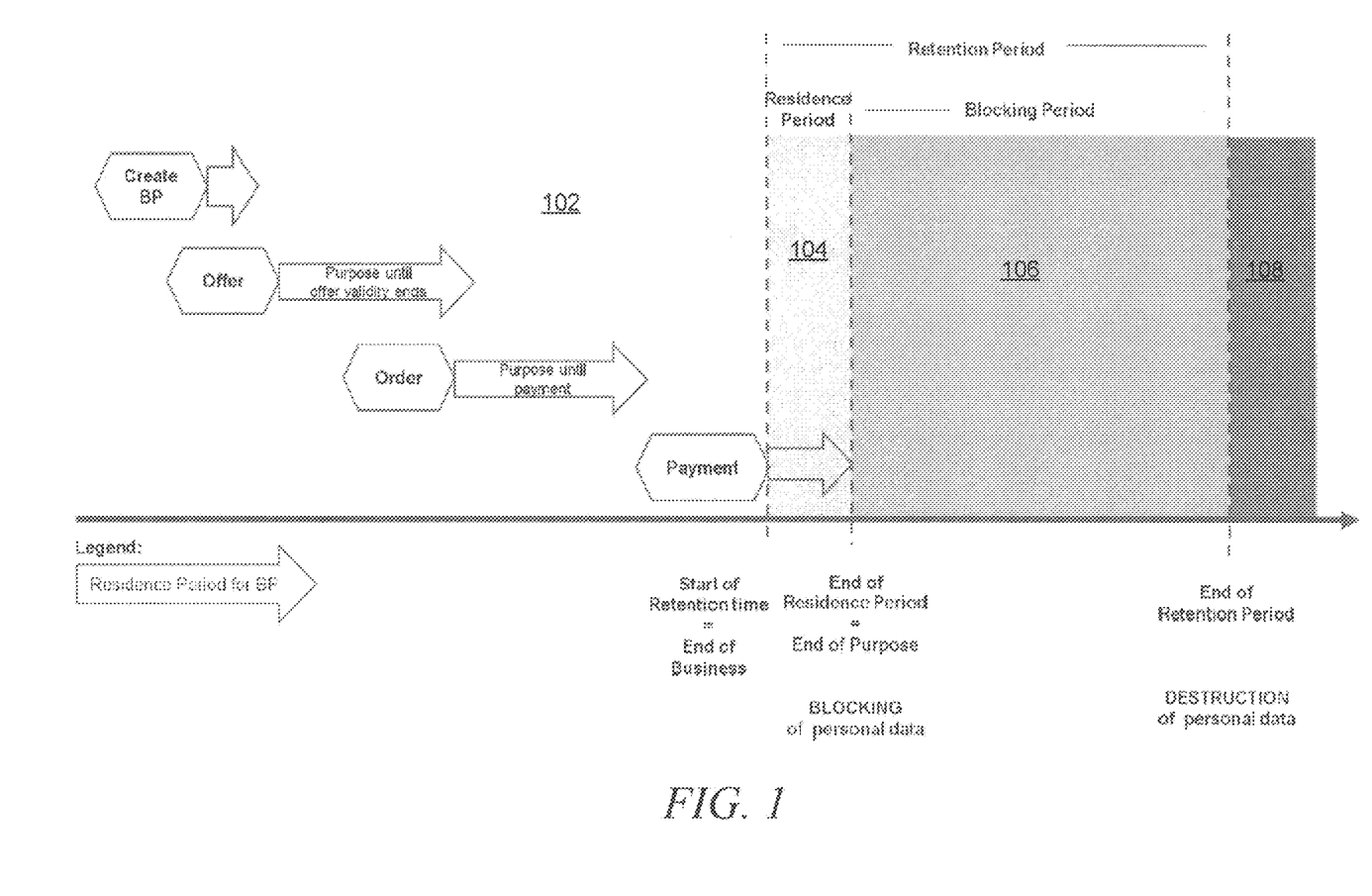
FIG. 1 is an illustration of residence, blocking, and retention periods, according to an example embodiment.

FIG. 1 is an illustration of residence, blocking, and retention periods, according to an example embodiment. The illustration of FIG. 1 is provided on a timeline that starts at the left and time elapses to the right. A first period 102 illustrates a time within which business partner data is created, processed, utilized in documenting transactions, and other such activities. The first period 102 ends at a time when the data processing activities with regard to that business partner are last performed. A second period 104, referred to as a residence period, commences immediately following the end of the first period 102. The second period 104, or residence period, as discussed above is a period within which access to the business partner data is generally available to users and processes, subject to data access privileges of users and processes that are common in modern data processing systems and environments. Note that if at any time during the second period 104, the residence second period 104 time may reset. For example, if the business partner places another order, requests a quote, and the like.

After expiration of the second period 104 (e.g., the residence period), a third period 106, referred to as a blocking period, begins. The third period 106 is a period within which the business partner data is stored, but access to that data is restricted to a small number of individuals and processes. For example, a data privacy officer responsible for setting and administering the second period 104, the third period 106, and a fourth period 108 durations, configurations, and access to data during these periods 104, 106, 108.

Following expiration of the third period 106, the fourth period 108 begins. The fourth period 108, referred to as the retention period or end of the retention period, is a period within which the business partner data is destroyed, such as by deletion, within a system. Thus, beginning with the third period 106 (i.e., the blocking period) and continuing through to the fourth period 108 (i.e., retention period), access to the business partner data is restricted and once the data is deleted, access is prevented. As a result, access to private data, which may include personal data, banking data, payment data, contact information, transactional data, and other data, is at least restricted if not prevented. Such embodiments thereby help organizations in ensuring private data of business partners, vendors, and customers remains private.

In some embodiments, during the third period 106 (i.e., the blocking period), an archive process may execute against the business partner data to copy or move the business partner data to an archive. The archive may be a flat file, data warehouse, other database, or other data storage device, system, or data structure.

The blocking of data access within the third period 106 and the deleting of data in the fourth period 108, in various embodiments, may include respective data blocking or delete actions with regard to one or both of business partner master data (e.g., name, address, banking information, etc.) and business partner transaction data (e.g., offers, quotes, orders, payments, etc.).

Figure 2:
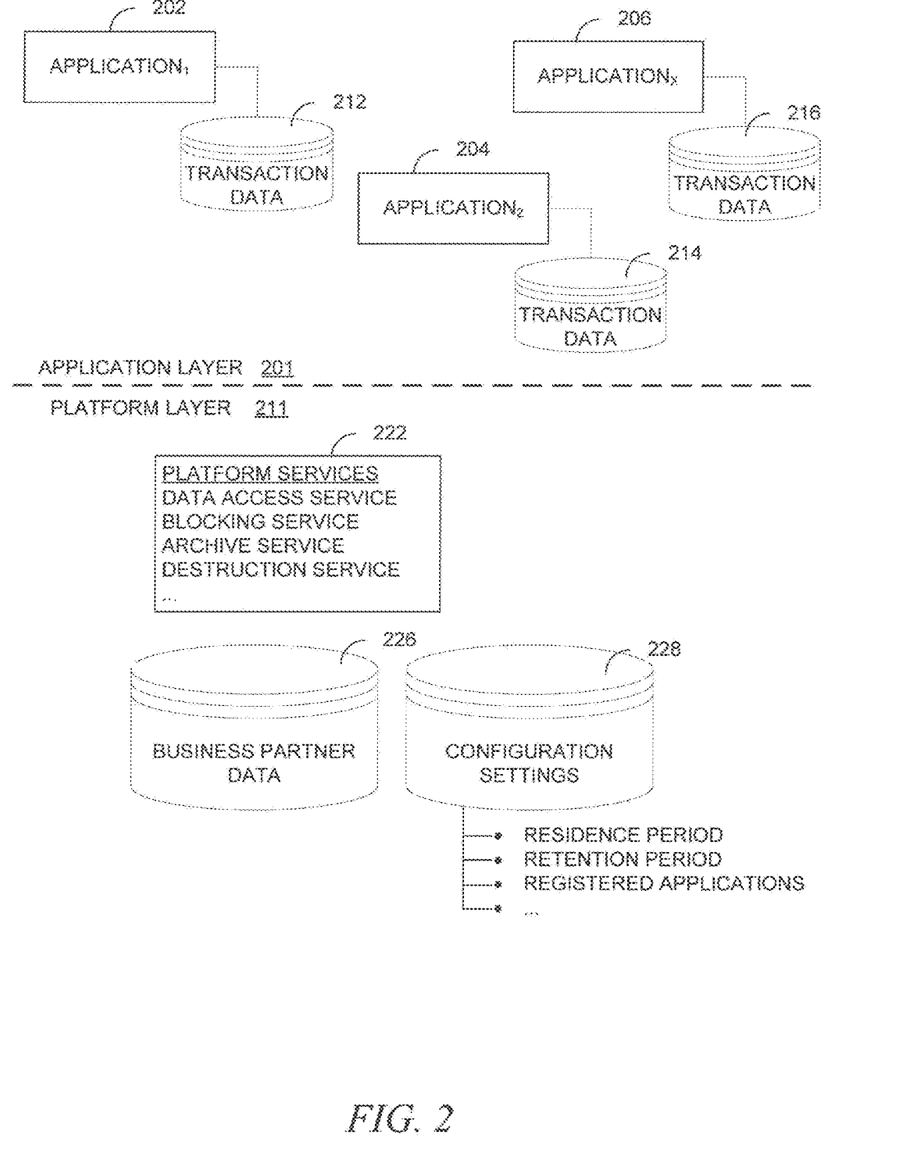
FIG. 2 is a block diagram of a system according to an example embodiment.

FIG. 2 is a block diagram of a system 200 according to an example embodiment. The system 200 provides an example of an enterprise computing environment within which some embodiments may be implemented. The system 200 includes an application layer 201 and a platform layer 211. The platform layer 211 provides certain services and data that is consumed by applications in the application layer 201. The application layer 201 includes one or more applications 202, 204, 206 through which users and processes interact with data and processes in a transactional computing context. Although two layers are illustrated with regard to the system 200, other embodiments may include more layers or a single layer, depending on an architecture chosen to implement a particular embodiment.

The applications 202, 204, 206 in the application layer typically include one or more applications of various types. Such application types may include Enterprise Resource Planning (ERP), Customer Relationship Management (CRM), Supplier Relationship Management (SRM), Human Resources Management (HRM), Logistics Management, and other such enterprise-type applications. Each of the applications 202, 204, 206 may maintain their own transaction data 212, 214, 216 in distinct databases or one or more databases that may be in the platform layer 211.

The services and data included in the platform layer 211 generally include configuration setting 228 and data that is common amongst some or all of the applications 202, 204, 206, such as business partner data 226. Platform services 212 provided in the platform layer 211 typically include services that are utilized by some or all of the applications 202, 204, 206, such as data and application security services, configuration processes, data access services, a data blocking service, data archiving services, and a data destruction service. In some embodiments, the platform services 212 may be present in their entirety in the platform level 211. However, in some embodiments, the platform services 212 may also exist in part in this application in one or more of the applications 202, 204, 206. For example, data blocking, archiving, and destruction services may include stub portions within one or more of the applications 202, 204, 206. For example, such stub portions of the respective services may to allow these services to block, archive, and destroy data under the control of or otherwise stored by the various applications 202, 204, 206, such as their respective transaction data 212, 214, 216.

The business partner data 226 may be stored in one or more tables. When stored in a single table, each individual customer, vendor, business partner, and the like is represented by a single row of data in the single table. When the business partner data 226 is stored in more than one table, the data is typically stored in relationally related tables that are related via a central table. In such multi-table embodiments, each individual customer, vendor, business partner, and the like is represented by a single row in the central table. The single table or the central table in the particular embodiment will include a column that stores a value indicating when data associated with the particular customer, vendor, business partner, and the like represented in the business partner data 226 is blocked. In some embodiments, this column stores a Boolean value, which indicates whether the associated data is blocked. This column will be referred to as the "block column."

In some embodiments, the business partner data 226 may include multiple sets of data stored in distinct sets of tables. For example, the business partner data 226 in some embodiments, may include customer data of individuals and customer data of business customers. Such data may be stored separately. Further, the business partner data 226 may also include vendor and supplier data, service provider data, and other categories of data that may be stored separately.

The configuration settings 228 stored in the platform layer 211 include data defining the residence period and retention period as described above. The configuration settings 228 may also include data representative of one or more applications 202, 204, 206 registered with a set of information lifecycle management services provided in the platform layer 211. The configuration settings 228 may also include data defining and tracking a periodic basis at which various services execute.

The information lifecycle management services may be formed by a portion of the platform services 212, such as the data access service, blocking service, archive service, and destruction service. Certain processes of the information lifecycle management services may execute on a periodic basis as defined and tracked in the configuration settings 228. For example, the blocking service, archive service, and destruction service may each execute on independently configured periodic schedules. In some embodiments, the blocking service may execute annually, while in other embodiments, it may execute daily, weekly, monthly, or on another period. The other services are also typically configured for periodic execution on similarly configured schedules. Although the data access service, blocking service, archive service, and destruction service may be a part of the information lifecycle management services, these services need not be grouped in such a manner and may instead be distinctly accessible as a part of the platform layer 211 services 222.

The blocking service operates with regard to business partner data 226 to determine when data within the system 200 associated with a particular row of business partner data is 226 to be blocked. Data subject to blocking is data outside of the residence period. When data associated with a row of business partner data 226 is determined to be blocked, the blocked column is set to block accesses to the data associated therewith. The setting of the block column to block access to data associated therewith, in some embodiments, blocks access to not only business partner data 226, but also transaction data 212, 214, 216 of registered applications 202, 204, 206. Thus, the applications 202, 204, 206 in such embodiments, prior to accessing transaction data 212, 214, 216 may query the business partner data 226 to determine if the needed data is blocked, such as via a data access service of the platform services 222. In some other embodiments, a service may be present in a database management system where relations between tables and data stored therein are utilized by a database management system process to identify a parent table where the blocking column data is present. When the service determines data associated with a particular row of data is blocked, the related data in related tables is blocked by this service. Thus, enforcement of blocking may be performed in one or more of application services, platform services, and within a database management system.

The archive service, included in some embodiments, may operate to move data out of the system 200 or to generate a snapshot of data at various points in time. The archive process in such embodiments may operate to archive only data that is currently being blocked.

The destruction service operates to identify, permanently remove, and delete data from the system 200. This data, in some embodiments, includes business partner data 226 and transaction data associated therewith. The data subject to the destruction service is data determined to be outside of the retention period.

In each of the blocking, archive, and destruction services, each row of business partner data 226 is considered with regard to a determined most recent date when the business partner data 226 was either modified or used with regard to a transaction in any one of the applications 202, 204, 206. The respective residence and retention periods are determined based on this determined most recent date.

Figure 3:
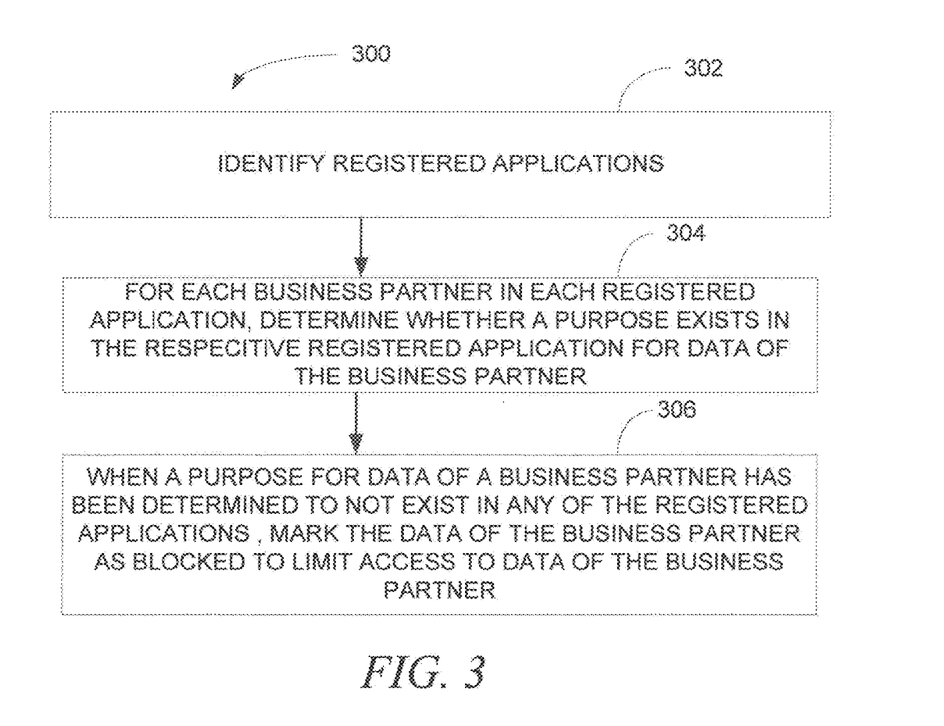
FIG. 3 is a block flow diagram of a method according to an example embodiment.

FIG. 3 is a block flow diagram of a method 300 according to an example embodiment. The method 300 is an example of a blocking method as described above. The method 300 includes identifying 302 registered applications under management of information lifecycle management processes. The method 300 then, for each business partner data entity (e.g., a row in a single table embodiment or a row in a central table of a multi-table embodiment) determines 304 whether the business partner data should remain accessible. For example, a determination may be whether the business partner data entity has been used in a respective registered application within a residence period. Such a determination can be made in many applications though evaluation of date-time stamps of data records indicating when the data was created or last modified. Such date-time stamps may exist in tables storing the data or in separate audit tables. Other similar data can be evaluated in differing embodiments to make such determinations. In another example, as illustrated, a determination is made as to whether a purpose exists in the respective registered application for data of the business partner. Such a purpose may include an incomplete transaction, a warranty period being open, an ongoing collaboration, and the like. Incomplete transactions, warranty periods, and the like can be determined in specific embodiments based on the particular data of the embodiment. In some embodiments, this may include manipulation of configuration settings, setting of transaction codes, and the like. However, in many applications and application suites, platform and application-synchronized processes and data elements may be utilized to determine whether a purpose remains to retain data.

In some embodiments, the determining 304 includes sending a request including a business partner data entity identifier from a platform layer service to a service of each registered application. The service of each registered application, in some such embodiments, may be a standardized service so as to be callable in a similar or identical manner across all registered applications. Each registered application in such embodiments may determine whether any transaction data has been generated or otherwise manipulated with regard to the particular business partner data entity within the residence period or if any purpose exists to continue to maintain the business partner data. Each registered application in such embodiments may then return an indication of that determination. In some embodiments, the applications may make their respective determinations in parallel.

Once the determination 304 has been made with regard to each application, depending on the embodiment such as when a purpose for data of a business partner has been determined to not exist in any of the registered applications or when data of the business partner has not been utilized within the residence period, the method 300 marks the business partner data as blocked to limit access to data of the business partner.

Figure 4:
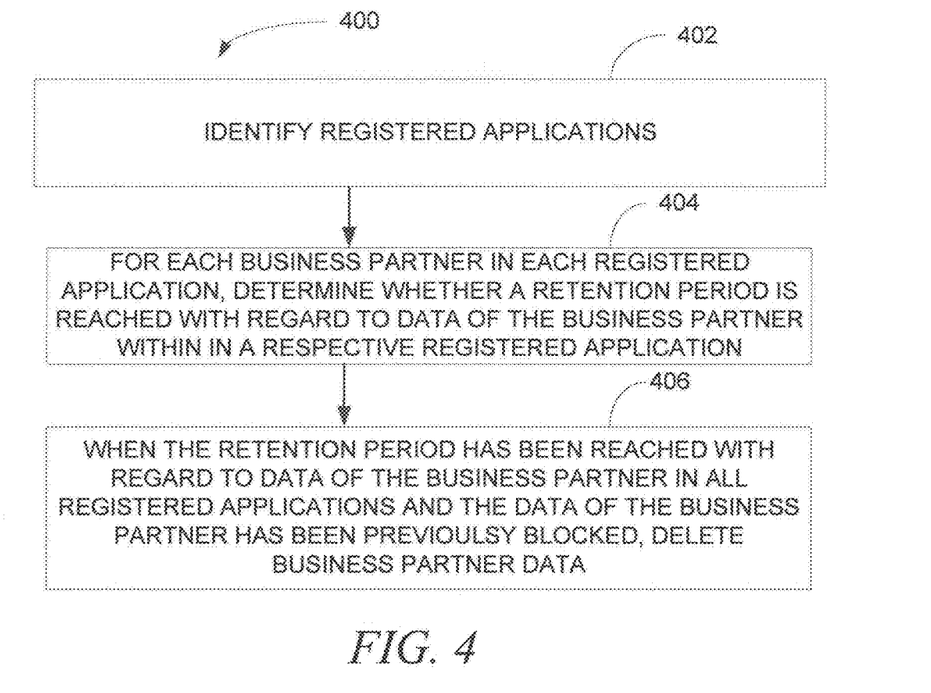
FIG. 4 is a block flow diagram of a method according to an example embodiment.

FIG. 4 is a block flow diagram of a method 400 according to an example embodiment. The method 400 is an example of a destruction method as described above. The method 400 includes identifying 402 registered applications under management of information lifecycle management processes. The method 400 then, for each business partner data entity (e.g., a row in a single table embodiment or a row in a central table of a multi-table embodiment) determines 404 in each registered application whether a retention period is reached.

In some embodiments, the determining 404 whether the retention period has been reached includes determining whether each business partner data entity has been used within the retention period or whether a purpose exists for continuing to maintain the business partner entity data. Each registered application in such embodiments may make such a determination based on global rules utilized across all registered applications or based on registered application-specific rules. Each registered application in such embodiments may then return an indication of that determination. In some embodiments, the applications may make their respective determinations in parallel.

Once the determination 404 has been made with regard to each application, the method 400 deletes 406 the business partner data entity data and issues delete commands to each registered application with regard to data of the particular business partner data entity. Such deletions 406, in some embodiments, are made only if the business partner entity data was previously blocked, although this is not a requirement in all embodiments.

Figure 5:
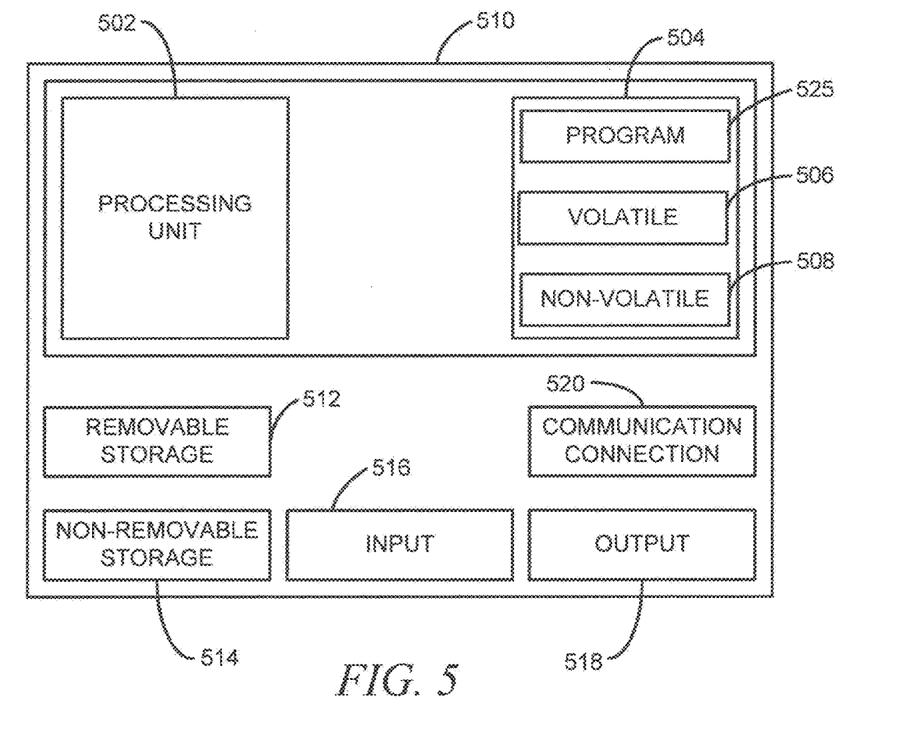
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a non-transitory computer-readable medium. For example, a computer program 525, or portion thereof, capable of performing one or more of the methods as illustrated and described herein may be stored on a computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:
1. A method comprising:
identifying, by retrieving computer application configuration settings from a data storage device, all applications registered to utilize information lifecycle management services with regard to residence, blocking, and retention periods for private data of entities, wherein:
the residence period is a period within which certain data is maintained and is accessible to a first group including at least one user or at least one process;
the blocking period is a period following the residence period within which the certain data is maintained but access of the particular data is blocked from at least a portion of the first group; and
the retention period is a period following the blocking period following the expiration of which the particular data is to be deleted; for each entity represented in a set of one or more private data tables and for each registered application, determining whether access to entity data stored in the one or more private data tables and registered applications should be blocked and whether a retention period is reached with regard to data of the respective entity, wherein:
determining whether access to entity data stored in the one or more private data tables and registered applications should be blocked includes evaluating date-time stamp data indicating when respective data was created or last modified in view of the residence period, date-time stamp data outside of the residence period indicating access to the respective entity data stored in the one or more private data tables and registered applications is to be blocked; and
determining whether a retention period is reached with regard to data of the respective entity includes evaluating the date-time stamp data indicating when respective data was created or last modified in view of the retention period, date-time stamp data outside of the retention period indicating access to the respective entity data stored in the one or more private data tables and registered applications is to be deleted;
for each entity where transaction data or private data in the private data tables should be blocked, blocking access to the transaction data and private data associated with the respective entity and moving the transaction data or private data for which access is blocked out of the set of one or more private data tables and each registered application to a data archive; and
for each entity where the retention period has been reached, deleting data of the entity from the set of one or more private data tables and each registered application.

2. The method of claim 1, wherein entity is a business unit of an organization.

3. The method of claim 1, wherein determining whether access to entity data stored in the one or more private data tables and registered applications should be blocked includes:
for each entity represented in the set of one or more private data tables and for each registered application, determining whether transaction data or private data in the private data tables has been utilized or created within the residence period; and
for each entity where transaction data or private data in the private data tables has not been utilized or created within the residence period, blocking access to the transaction data and private data associated with the respective entity.

4. The method of claim 1, wherein determining whether access to entity data stored in the one or more private data tables and registered applications should be blocked includes:
for each entity represented in the set of one or more private data tables and for each registered application, determining whether a purpose exists for continued use of transaction data or private data in the private data tables; and
for each entity, when a purpose does not exist in any of the registered applications with regard to transaction data or private data in the private data tables, blocking access to the transaction data and private data associated with the respective entity.

5. The method of claim 1, wherein determining whether access to entity data stored in the one or more private data tables and registered applications should be blocked includes:
for each entity represented in the set of one or more private data tables and for each registered application, determining whether transaction data or private data in the private data tables has been utilized or created within the residence period;

for each entity represented in the set of one or more private data tables and for each registered application, determining whether a purpose exists for continued use of transaction data or private data in the private data tables;

for each entity, when a purpose does not exist for continued use of transaction data or private data in the private tables or in any of the registered applications and where transaction data or private data in the private data tables has not been utilized or created within the residence period, blocking access to the transaction data and private data associated with the respective entity.

6. The method for claim 1, wherein deleting data of the entity further includes deleting archived data.

7. A non-transitory computer readable medium, with instructions stored thereon which when executed by at least one processor of at least one computing device causes the at least one computing device to:

identify, by retrieving computer application configuration settings from a data storage device, all applications registered to utilize information lifecycle management services with regard to residence, blocking, and retention periods for private data of entities, wherein:

the residence period is a period within which certain data is maintained and is accessible to a first group including at least one user or at least one process;

the blocking period is a period following the residence period within which the certain data is maintained but access of the particular data is blocked from at least a portion of the first group; and the retention period is a period following the blocking period following the expiration of which the particular data is to be deleted; for each entity represented in a set of one or more private data tables and for each registered application, determine whether access to entity data stored in the one or more private data tables and registered applications should be blocked and whether a retention period is reached with regard to data of the respective entity, wherein:

determining whether access to entity data stored in the one or more private data tables and registered applications should be blocked includes evaluating date-time stamp data indicating when respective data was created or last modified in view of the residence period, date-time stamp data outside of the residence period indicating access to the respective entity data stored in the one or more private data tables and registered applications is to be blocked; and determining whether a retention period is reached with regard to data of the respective entity includes evaluating the date-time stamp data indicating when respective data was created or last modified in view of the retention period, date-time stamp data outside of the retention period indicating access to the respective entity data stored in the one or more private data tables and registered applications is to be deleted;

for each entity where transaction data or private data in the private data tables should be blocked, blocking access to the transaction data and private data associated with the respective entity and moving the transaction data or private data for which access is blocked out of the set of one or more private data tables and each registered application to a data archive; and when the retention period of an entity has been reached, delete data of the entity from the set of one or more private data tables and each registered application.

8. The non-transitory computer readable medium of claim 7, wherein deleting data of the entity further includes deleting archived data.

9. The non-transitory computer readable medium of claim 7, wherein an entity is a business unit of an organization.

10. The non-transitory computer readable medium of claim 7, with further instructions stored thereon which when executed by the at least one processor of the at least one computing device further causes the at least one computing device to:

for each entity represented in a set of one or more private data tables and for each registered application, determine whether transaction data or private data in the private data tables has been utilized or created within the residence period; and for each entity where transaction data or Ovate data in the private data tables has not been utilized or created within the residence period, block access to the transaction data and private data associated with the respective entity.

11. The non-transitory computer readable medium of claim 7, with further instructions stored thereon which when executed by the at least one processor of the at least one computing device further causes the at least one computing device to:

for each entity represented in a set of one or more private data tables and for each registered application, determine whether a purpose exists for continued use of transaction data or private data in the private data tables; and for each entity, when a purpose does not exist in any of the registered applications with regard to transaction data or private data in the private data tables, block access to the transaction data and private data associated with the respective entity.

12. A system comprising:

at least one processor, at least one memory device, and at least one database;

a data blocking module stored on the at least one memory device and executable by the at least one processor to:

identify, by retrieving computer application configuration settings from the at least one memory device, applications registered to utilize information lifecycle management services with regard to residence, block, and retention periods for private data of entities stored in the at least one database, wherein:

the residence period is a period within which certain data is maintained and is accessible to a first group including one user or at least on process;

the blocking period is a period following the residence period within which the certain data is maintained but access of the particular data is block blocked from at least a portion of the first group; and the retention period is a period following the blocking period following the expiration of which the particular data is to be deleted; for each entity represented in a set of one or more private data tables present in the at least one database and for each registered application, determine whether access to entity data stored in the one or more private data tables and registered applications should be blocked and whether a retention period is reached with regard to data of the respective entity, wherein:

determining whether access to entity data stored in the one or more private data tables and registered applications should be blocked includes evaluating date-time stamp data indicating when respective data was created or last modified in view of the residence period, date-time stamp data outside of the residence period indicating access to the respective entity data, stored in the one or more private data tables and registered applications is to be blocked; and determining whether a retention period is reached with regard to data of the respective entity includes evaluating the date-time stamp data indicating when respective data was created or last modified in view of the retention period, date time stamp data outside of the retention period indicating access to the respective entity data stored in the one or more private data tables and registered applications is to be deleted;

for each entity where transaction data or private data in the private data tables should be blocked, write data to the at least one database and issue commands to each registered application to block access to the transaction data and private data associated with the respective entity and moving the transaction data or private data for which access is blocked out of the set of one or more private data tables and each registered application to a data archive; and for each entity where the retention period has been reached, issue delete commands to the at least one database and issue commands to each registered application to delete data of the entity from the set of one or more private data tables and each registered application.

13. The system of claim 12, wherein an entity is a business unit of an organization.

14. The system of claim 12, wherein determining whether access to entity data stored in the one or more private data tables and registered applications should be blocked includes:

for each entity represented in the set of one or more private data tables and for each registered application, determine whether transaction data or private data in the private data tables has been utilized or created within the residence period; and for each entity where transaction data or private data in the private data tables has not been utilized or created within the residence period write data to the at least one database and issue commands to each registered application to block access to the transaction data and private data associated with the respective entity.

15. The system of claim 12, wherein determining whether access to entity data stored in the one or more private data tables and registered applications should be blocked includes:

for each entity represented in the set of one or more private data tables and for each registered application, determine whether a purpose exists for continued use of transaction data or private data in the private data tables; and for each entity, when a purpose does not exist in any of the registered applications with regard to transaction data or private data in the private data tables, write data to the at least one database and issue commands to each registered application to block access to the transaction data and private data associated with the respective entity.

16. The system of claim 12, wherein determining whether access to entity data stored in the one or more private data tables and registered applications should be blocked includes:

for each entity represented in the set of one or more private data tables and for each registered application, determine whether transaction data or private data in the private data tables has been utilized or created within the residence period;

for each entity represented in the set of one or more private data tables and for each registered application, determine whether a purpose exists for continued use of transaction data or private data in the private data tables;

for each entity, when a purpose does not exist for continued use of transaction data or private data in the private tables or in any of the registered applications and where transaction data or private data in the private data tables has not been utilized or created within the residence period, write data to the at least one database and issue commands to each registered application to block access to the transaction data and private data associated with the respective entity.

* * * * *